Oct. 7, 1941.  S. R. HOWARD  2,258,182

AUTOMATIC WEIGHING MACHINE

Filed Feb. 24, 1938  2 Sheets-Sheet 1

INVENTOR
BY Stanley R. Howard
J. Stanley Churchill
ATTORNEY

Oct. 7, 1941.　　　S. R. HOWARD　　　2,258,182
AUTOMATIC WEIGHING MACHINE
Filed Feb. 24, 1938　　　2 Sheets-Sheet 2

INVENTOR
Stanley R. Howard
BY J. Stanley Churchill
ATTORNEY

Patented Oct. 7, 1941

2,258,182

UNITED STATES PATENT OFFICE 2,258,182

AUTOMATIC WEIGHING MACHINE

Stanley R. Howard, Milton, Mass., assignor to Pneumatic Scale Corporation, Limited, Quincy, Mass., a corporation of Massachusetts Application February 24, 1938, Serial No. 192,243

8 Claims. (Cl. 249—15)

This invention relates to a packaging machine and more particularly to an automatic weighing machine.

The invention has for an object to provide a novel and improved packaging machine of the type embodying a vibratory feed conduit for feeding a stream of material to be packaged, and in which provision is made for controlling the flow of the material in a manner such as to insure maximum uniformity in the stream.

Another object of the invention is to provide a novel and improved weighing machine of the type embodying a vibratory conveyor for feeding a stream of material to be weighed, and in which provision is made for controlling the flow of the material being introduced into the conveyor from a supply hopper in a manner such that variations in the density of the material caused by variations in the static head of the latter may be absorbed and equalized in a reservoir in the conduit prior to cutting down the size of the stream to the required volume whereby to insure maximum uniformity in the stream discharged from said conveyor irrespective of the variations in the static head of the material in said supply hopper.

A further and more specific object of the invention is to provide a novel and improved weighing machine of the type embodying a vibratory feed conduit for feeding the material to be weighed, and in which provision is made for changing the flow of the material from a bulk to a drip stream in a manner such as to insure maximum uniformity in the drip stream to enable maximum uniformity in the weights to be obtained.

With these general objects in view and such others as may hereinafter appear, the invention consists in the packaging machine, in the weighing machine and in the various structures, arrangements and combinations of parts hereinafter described and particularly defined in the claims at the end of this specification.

Figure 1:
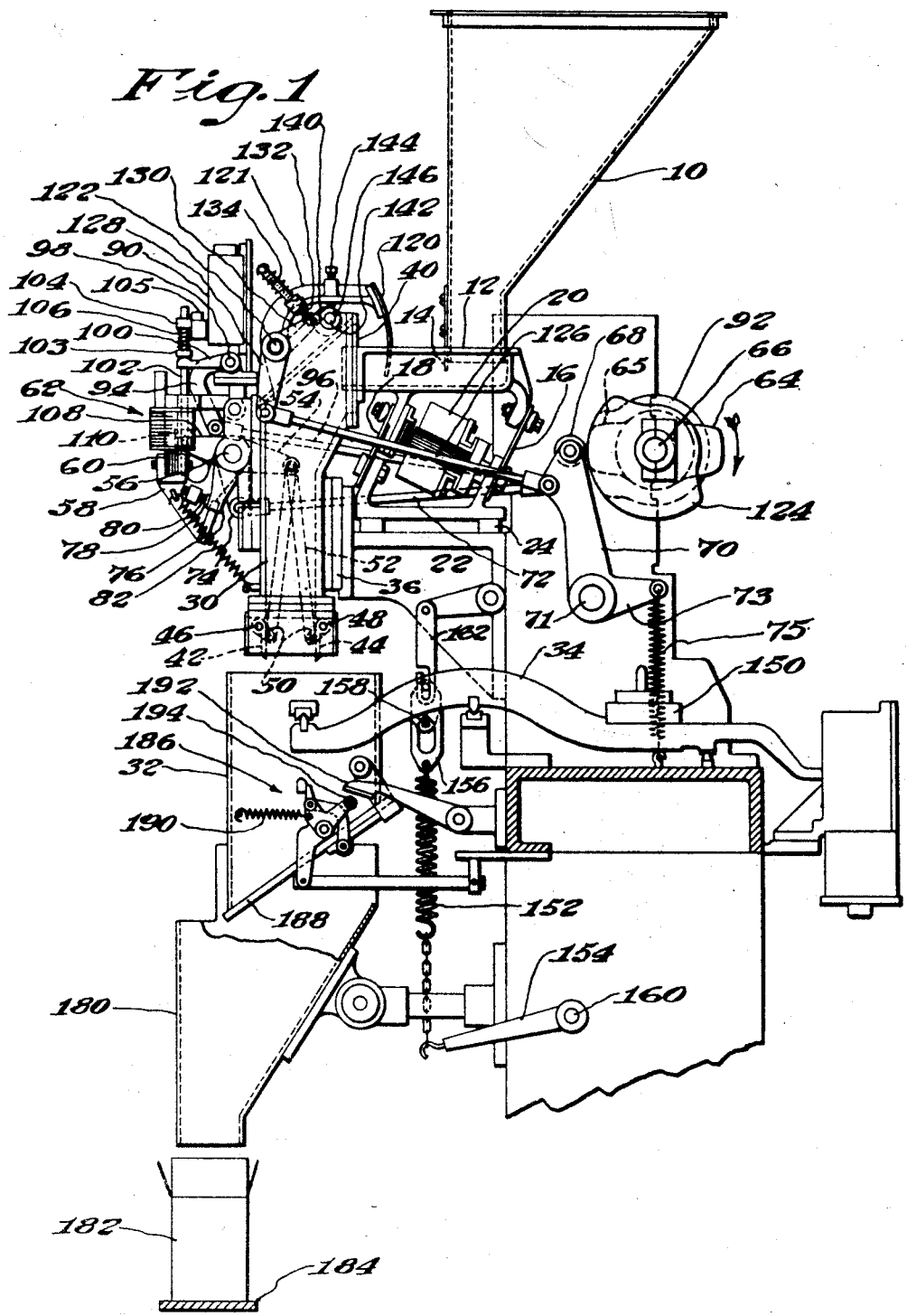
Figure 2:
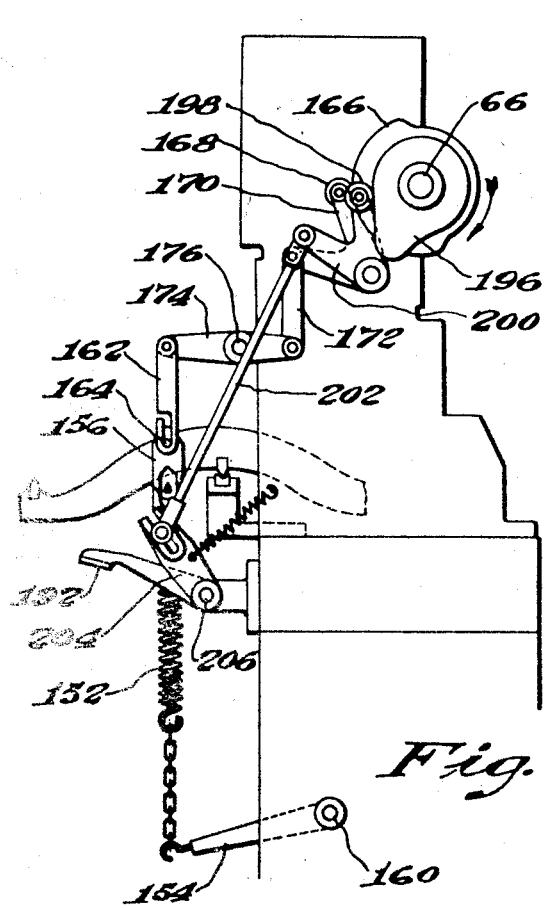
Figure 3:
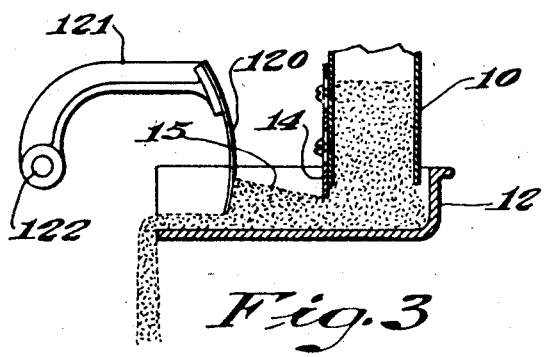
Figure 4:
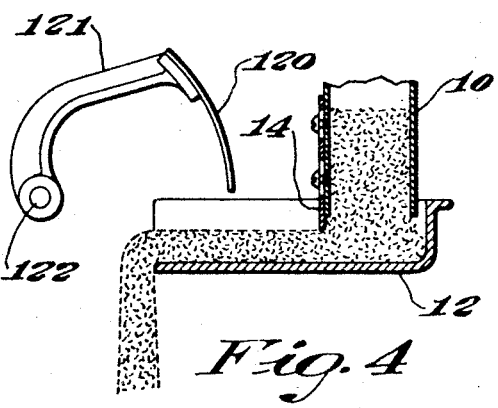
Figure 5:
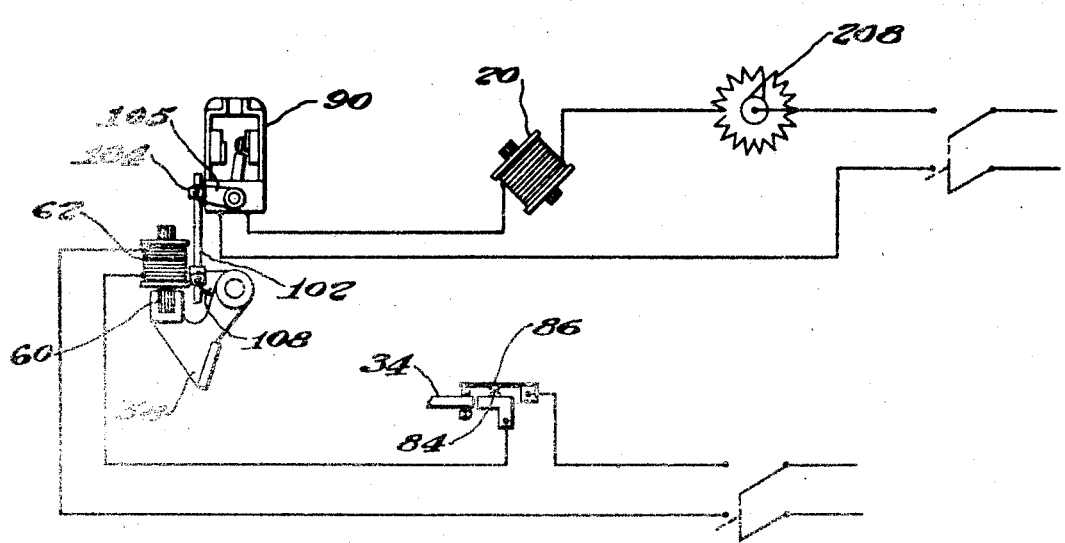

In the drawings illustrating the preferred embodiment of the invention, Fig. 1 is a side elevation of a sufficient portion of a weighing machine embodying the present invention to enable the invention to be understood; Fig. 2 is a detail in view in side elevation illustrating a portion of the mechanism shown in Fig. 1; Figs. 3 and 4 are detail views in cross-section illustrating the vibratory feeder and the gate in different positions of operation for controlling the stream of material being fed, and Fig. 5 is a wiring diagram showing the circuit for controlling the vibration of the feeder.

Heretofore, in prior weighing machines of the type embodying a vibratory feed conduit, attempts have been made to control the stream of material being fed by varying the amplitude of vibration of the feed conduit from a high rate of vibration during the bulk weighing period of operation to a low rate of vibration during the drip weighing period of operation of the machine. Experience has demonstrated that this type of control for the feed conduit is unsuitable for certain materials, particularly materials which have a tendency to stick together or to form lumpy particles, because during the period when the vibrator was operated at a low rate of vibration the material would tend to break off, in sections, from the mouth of the conduit and cause a lack of uniformity in the drip stream. It was also found that this type of control would tend to produce a supply of material in the conduit which was variable in depth because the restricted area of the throat of the hopper from which the material emanates into the conduit would cause the material to be released spasmodically, according to the nature of the material. These disadvantages in the variable rate of vibration for the control of the bulk and drip streams materially interfered with obtaining uniformity in the stream and consequently in the weights produced.

In accordance with the present invention, provision is made for mechanically changing the stream of material being fed from the vibratory conduit during the different portions of the weighing operation by a gate, while the conduit maintains a constant rate of vibration of relatively high amplitude, during each portion of the weighing cycle. In the illustrated machine provision is made for feeding the material in such a manner as to produce a stream of uniform consistency during each weighing period so that a large stream of material may be fed during the bulk feeding cycle of operation and a relatively small stream of material may be fed during the drip cycle of operation. By maintaining a relatively high frequency of vibration in the feed conduit during both portions of the weighing operation, the material tends to level off in the conduit and even itself up to a uniform depth and also to disintegrate any material which may be formed in lumps so that a stream of maximum uniformity is assured. It is also preferred in the illustrated machine to maintain a reservoir of material between the throat of the supply hopper and the gate for reducing the stream whereby the material may be permitted to expand and become loosened before it is discharged from the conduit so that a stream of material of uniform density may be maintained. The provision of a gate at a spaced distance from the hopper throat permits the use of a less restricted opening in the hopper whereby the static head of the material in the hopper may be utilized to maintain a constant and more uniform supply in the conduit.

In the illustrated machine and in the following description of the preferred embodiment of the invention, movement of the cam shaft is referred to as a cycle of operation and in the particular machine illustrated, one cycle constituting one half revolution of the cam shaft causes a relatively small increment of material to be added to bring the bulk load to a predetermined finished weight and another cycle constituting another half revolution of the cam shaft causes a bulk feeding and weighing cycle. The rotation and operation of the cam shaft in the above described manner may be accomplished in any usual manner, preferably by a one revolution clutch, not shown, which may be geared to the cam shaft at a ratio of 2 to 1 so that one revolution of the clutch will rotate the cam shaft one half a revolution. Suitable connections for controlling the operation of the one revolution clutch from the movement of the scale beam are also preferably provided in accordance with the construction and operation of the well-known automatic weighing machine now upon the market. As the manner of driving the cam shaft does not of itself form a part of the present invention, further description thereof is deemed unnecessary.

Referring now to the drawings, in the illustrated machine, 10 represents the storage hopper for the bulk supply of material to be weighed and from which the material flows by gravity into the material delivery conduit 12. Although, for purposes of illustration, but one weighing unit is herein shown, it will be understood that the present invention may preferably be incorporated in a multi-unit weighing machine, wherein the hopper 10 supplies material to each of the material delivery conduits 12. The supply hopper 10 is provided with a suitable adjusting plate 14 for varying the amounts of material permitted to flow into the conduit 12. As herein shown, the material delivery conduit is arranged to be vibrated to feed the material through the conduit in a uniform stream. As illustrated in Fig. 1 the delivery conduit 12 is mounted to be vibrated through connections including a thin steel strap 16, secured at one end, and a second strap 18 at the other end is connected to an electrically operated vibratory motor 20 of any usual or preferred structure. The vibratory unit is mounted upon a bracket 22 extending from the machine frame and is provided with suitable shock absorbing washers 24 between it and the bracket 22.

In accordance with the present invention, provision is made for initiating the vibration of the delivery conduit, as will be hereinafter described, to feed the material, and in the illustrated machine the material is fed first through an accumulating chamber 30 and then into a weighing bucket 32 mounted upon one end of a scale beam 34 and provision is made for stopping the vibration of the delivery conduit 12 and for cutting off the supply of material through the hopper 30 by the movement of the scale beam 34 when the scale has made its weight. As herein shown, the hopper 30 comprises a vertical chamber mounted upon a plate 36 secured to the bracket 22 and is provided at its upper end with an offset communicating with the mouth of the conduit 12. A flexible gasket or adapter 40 composed of leather or other suitable material is provided to connect the conduit 12 to the hopper 30 so as to permit vibration of the conduit without effecting vibration of the hopper. The hopper 30 is further provided, at its lower end, with a pair of shutters 42, 44, mounted upon rock shafts 46, 48 journaled in the hopper.

Provision is made for opening the shutters 42, 44 at the beginning of each weighing operation and for automatically closing the shutters at the end of each weighing operation, and, as herein shown, each rock shaft 46, 48 is provided with an arm 50, connected by links 52 to one arm 54 of a lever loosely mounted upon a shaft 56 journaled in suitable bearings secured to the hopper 30. The second arm 58 of the loosely mounted lever is provided with the movable member 60 of any usual or preferred form of electromagnet, indicated generally at 62. The connections for raising the movable member 60 in order to retain the shutters 42, 44 in their open positions during the weighing period include a cam 64 fast on a cam shaft 66, a cooperating roller 68 mounted on a cam lever 70, a connecting rod 72 and a lever 74 fixed to the shaft 56. A second lever 76 also fixed to the shaft 56 is provided with a bearing surface 78 arranged to engage a stud 80 extending from the arm 58. The shutters are normally held in their closed position by a spring 82, one end of which is secured to the hopper 30 and the other end to the arm 58. The cam lever 70 and cam roller 68 comprise one set of three duplicate levers and cam rolls, the upper of which is shown in Fig. 1. All of the levers 70 are loosely mounted upon a rocker shaft 71 and each lever is connected to a separate connecting rod as will be hereinafter described. Each lever 70 is provided with a second arm 73 to which a spring 75 is attached in order to hold each roll 68 against its respective cam.

In the illustrated machine, the shutters 42, 44 are arranged to be opened at the beginning of each weighing cycle and as herein shown, the cam 64 is provided with a second lobe 65 so that the shutters are opened and closed twice during each complete weighing operation. During the operation of the machine, the cam 64 is arranged to raise the movable member 60 into contact with the electromagnet 62, operating to retain the shutters in their open position while the cam 64 advances beyond the high point and comes to rest in this position. Thus the shutters are free to close, through the spring 82, when the electromagnet 62 is de-energized to release the arm 58. As shown in Fig. 5, the electromagnet 62 is wired to a contact member 84 with which a movable contact 86 moved by the end of the scale beam cooperates, so that when the scale beam makes its weight, the contacts 84, 86 are opened and the electromagnet is de-energized.

Provision is made for initiating the vibration of the feeding conduit 12 at the beginning of each cycle of operation and for thereafter, during the remainder of the cycle, permitting the vibration of the feeding conduit to be controlled by the movement of the scale beam. As herein shown, see Fig. 1, the vibration of the material delivery conduit is controlled through a switch 90 which is arranged to be closed by a cam 92 fast on the cam shaft 66. The cam 92 cooperates with one of the rollers 68 carried by one of the levers 70 and is connected to a curved lever 94 by a rod 96. The lever 94 is fixed to a shaft 98 and a second lever 100, provided with a bifurcated end, embraces a vertical rod 102 and is arranged to engage the underside of a collar 103 fixed thereto. The upper end of the vertical rod 102 is slidingly fitted into a swivel connection 104 carried by the switch arm 105. A coil spring 106, fitted between the collar 103 and the swivel connection normally tends to urge the arm 105 upwardly to close the switch.

In the operation of the machine, after the switch 80 has been closed through the connections above described, the cam 92 comes to rest in a position such that the roller 68 is on the low part of the cam in which position the bifurcated lever 100 is rocked away from contact with the underside of the collar 103. During this time the vertical rod 102 is retained in a position to keep the switch closed by an arm 108 formed as a part of and arranged to operate simultaneously with the arm 98. The arm 108 is provided with a similar swivel connection through which the rod 102 is free to slide and, as herein shown, the swivel connection is arranged to engage the underside of a second collar 110 also fast on the rod 102.

From the description thus far it will be observed that when the scale beam makes its weight the contacts 84, 86 are opened and the electromagnet is de-energized whereupon the arm 98 is released and the shutters 42, 44 are closed. It will also be observed that at this time the arm 108 will have been rocked downwardly, permitting the vertical rod to drop and thus open the vibrator switch 80 to terminate the feeding operation. It will be understood that the above described operations take place during the first cycle or bulk weighing period of operation of the machine.

In accordance with the present invention and as illustrated in Figs. 1, 3 and 4, provision is made for changing the size of the stream being fed by the vibratory conduit 12 so that a large stream of material will be fed during the bulk feeding cycle and a small stream will be fed during the remaining cycle of the weighing operation while the conduit is maintained at a relatively high frequency of vibration. As herein shown, a gate 120, secured to a lever 121 loosely mounted upon a shaft 122 journaled in the upper portion of the hopper 10 is arranged to be rocked downwardly into the path of the material in the conduit so as to cut off a portion of the full stream of material being fed during the drip feeding period and to be rocked upwardly to permit the normal stream of material in the conduit to flow into the scale bucket 22 during the bulk feeding period. The gate 120 is positioned in spaced relation to the throat of the supply hopper 10, and as herein shown, is arranged to be rocked by a cam 124, mounted on the cam shaft 66 through connections including one of the cooperating rollers 68 mounted upon one of the levers 70 and a connecting rod 126 connected to one arm 128 of a bell crank fixed to the pivot shaft 122. The second arm 130 of the bell crank is provided with a bearing surface which is arranged to engage a stud 132 fixed in the gate arm 121. A spring 134, one end of which is attached to the arm 130 and the other end to a spring hook in the arm 121, normally holds the arms 130, 121 together in operating relationship.

In order to adjust the downward position of the gate so as to permit a reduction in the size of the stream during the latter half cycle of operation, an eccentric stop 140 is adjustably mounted upon a stud 142. A set screw 144 in the arm 121 is arranged to engage the eccentric stop 140 to limit the downward movement of the gate. A set screw 146 is provided in the eccentric in order to permit adjustment of the position of the latter on the stud 142. Thus it will be seen that although the cam 124 operates to move the connecting members through a fixed stroke, the yielding connection between the arm 121 and the arm 130 permits the gate to be stopped at its adjusted position as limited by the eccentric 140 and set screw 144.

During the operation of the machine, the material in the supply hopper 10 is introduced into the vibratory conduit 12 by gravity and during the vibratory movement of the conduit, the material is advanced toward the mouth of the conduit to be discharged. The adjustable plate 14 at the throat of the hopper determines the depth of the stream to be maintained during the bulk feeding period of operation and by maintaining a relatively high frequency of vibration in the conduit a stream of maximum uniformity may be obtained. In order to change the size of the stream for the drip feeding period, the gate 120 is rocked downwardly to cut off a portion of the stream and the conduit may be vibrated at the same frequency as during the bulk feeding period.

It will be observed that by maintaining a relatively high frequency of vibration of the conduit, the material will be discharged in a stream of maximum uniformity. It will also be observed that during the drip feeding period, the space between the throat of the hopper and the gate 120 permits the material to enter the conduit from the hopper more readily and in effect provides a greater head to assist in the flow of the material than if the material were to be cut off by restricting the opening at the hopper throat. In practice, it is desirable to have as large an outlet from the supply hopper as practicable in order to permit the material to flow as freely as possible therefrom. However, since the material flows by gravity from the hopper, any variation in the static head of the material in the hopper will cause the flow of material therefrom to vary in accordance with such pressure. Such variations in flow tend to materially affect the accuracy of the weighing operations. However, in accordance with the present invention, it will be observed that by providing a gate intermediate the hopper and the mouth of the conduit a reservoir 15 is provided to enable the material to expand and absorb any variations in the flow of the material from the hopper throat, thus enabling a drip stream of maximum uniformity to be had, irrespective of variations in the flow from the hopper throat, thus contributing to accuracy in weighing.

In order to permit two weighings of the load during one cycle of operation, provision is made for depressing the weighing end of the scale beam during the first cycle of weighing, with a sufficient weight or tension to correspond approximately to the weight of the material to be added during the second or drip cycle of the machine. Provision is also made for removing the above stated tension during the drip cycle in order to permit the scale to weigh the completed load. The second end of the scale beam 34 is provided with the usual counterweight 150 corresponding to the total or complete weight of the load.

As herein shown, the tension upon the weighing end of the scale beam is effected by a spring 152 attached at one end to an arm 154 and at the other end to a slotted member 156 which is arranged to hook over a pin 158 extending from the scale beam. The arm 154 may be adjusted on its stud 160 in order to increase or decrease the effective tension in the spring. Provision is made for raising the member 156 upwardly, see Fig. 2, in order to free the scale beam for its final load weighing and as herein shown, a hooked member 162, adapted to engage a pin 164 extending from the member 156, is arranged to be raised and lowered by a cam 166 mounted on the cam shaft 66. The connections between the cam 166 and the hooked member 162 include a cooperating roller 168, a bell crank 170, link 172 and a two armed lever 174 pivoted at 176. It will be seen that the cam 166 is designed to permit the tension to be applied to the scale beam during one half revolution and to retain the tension applying members in their raised or ineffective position during the other half revolution.

Provision is made for automatically releasing the weighed load in the receptacle 32 in order to permit the material to flow by gravity through the funnel 180 and into a container 182 supported upon a conveyor 184. As herein shown, see Fig. 1, a toggle mechanism, generally indicated at 186, normally holds the gate 188 in its closed position through the tension of the spring 190. The gate is arranged to be opened by an arm 192 which is rocked into engagement with a roller 194 to release the toggle mechanism. The arm 192 is arranged to be rocked by a cam 196, fast on the cam shaft 66, through connections including a cooperating roller 198, a bell crank 200, connecting rod 202 and a lever 204 fast on the rocker shaft 206 upon which the arm 192 is also fast.

From the description thus far, it will be observed that in the operation of the illustrated machine, two separate and distinct weighing operations are performed during each complete operation of the machine and that the bulk weighing operation is performed during the first cycle and the final weighing operation is performed during the second cycle. While provision is made for manually controlling the amplitude of vibration of the material feeding conduit 12 by provision of a rheostat 208 in the circuit, see Fig. 5, the conduit is vibrated during the cycles of operation of the machine at a constant rate and the flow of the material from the conduit is mechanically and positively regulated by the gate 120.

It will also be observed that material may be accumulated in the chamber 30 during the time that the receptacle 32 is being emptied. This may be preferably accomplished by setting the vibrator switch cam 92 slightly ahead of the cam 64 for opening the shutters so that when the receptacle 32 has completed dumping its load and has returned to weighing position the accumulated load may be released. This action occurs only during the bulk weighing cycle of operation as during the drip feed cycle, the vibrator switch 90 is controlled by the movement of the arm 58 as above described.

The operation of the machine may be briefly summarized as follows: During the first cycle of the machine the first operation which occurs is the releasing of the previously weighed load from the weighing bucket 32 into the package 182 positioned beneath the guide chute 180. Simultaneously therewith the cam 92 operates to close the switch 90 to initiate the vibration of the material feeding conduit 12. The shutters 42, 44 are at this time in their closed position, and during the period when the load is being dumped from the weighing bucket and the scale returned to weighing position, a partial load is accumulated in the hopper 30. At this time the gate 120 is in its raised position to permit the normal or bulk flow of material from the conduit 12 as illustrated in Fig. 4. When the scale beam 34 has returned to weighing position, the slotted member 156 is lowered to permit the spring 152 to apply a tension upon the weighing end of the scale beam and the arm 58 is rocked to open the shutters 42, 44 and to retain the vibrator switch 90 in its closed position. The arm 100 is now rocked downwardly to permit the switch 90 to be controlled by the arm 58 during the remainder of the cycle. When the scales makes its weight, the arm 58 is released, closing the shutters and stopping the vibratory motor. The machine is now ready to start on its second cycle of operation during which time the spring weight 156 is raised, the plate 120 is rocked to its lowered position as illustrated in Fig. 3 and the arm 58 is reset to start the vibrations and open the shutters. When the scale makes its final load weight a new cycle of operations is initiated.

While the preferred embodiment of the invention has been herein illustrated and described, it will be understood that the invention may be embodied in other forms within the scope of the following claims.

Having thus described the invention, what is claimed is:

1. In a weighing machine of the character described, a control shaft arranged to be operated in successive cycles, a weighing device, a vibratory conveyor for feeding material to said weighing device, means for vibrating the conveyor at a substantially constant rate of vibration sufficiently high to form a bulk stream and greater than is required to form a drip stream, during both bulk and drip feeding cycles, a gate positioned intermediate the ends of the conveyor capable of holding back the major portion of the material to change the size of the stream being discharged from a bulk stream to a drip stream independently of the vibration of the conveyor and to effect a damming of the material behind the gate, and connections between said control shaft and said gate for changing the position of the latter at the beginning of each feeding cycle.

2. In a weighing machine of the character described, a control shaft arranged to be operated in successive cycles, a weighing device, a vibratory conveyor for feeding material to said weighing device, means for vibrating the conveyor at a relatively high rate of vibration, a hopper for supplying material to said conveyor and through which material is delivered in variable quantities in accordance with the static pressure of the material therein, a mechanically operated gate positioned intermediate the ends of said conveyor in the path of the forwardly moving material therein, and spaced a substantial distance from a throat of said hopper, said conveyor being vibrated at a rate sufficiently high to produce a bulk stream and greater than required to produce the drip stream, said gate being capable of holding back the major portion of the bulk stream and for partially cutting off a portion of the latter to change it into a drip stream, and connections between said control shaft and said gate for changing the position of the latter at the beginning of each cycle of operation.

3. In a weighing machine of the character described, a control shaft arranged to be operated in successive cycles, a weighing device, a vibratory conveyor for feeding material to said weighing device, means for vibrating the conveyor at a relatively high rate of vibration, a hopper for supplying material to said conveyor and through which material is delivered in variable quantities in accordance with the static pressure therein, said hopper being provided with means for adjusting to some extent at least, the size of a bulk stream to be discharged from said conveyor, said conveyor being vibrated at a rate sufficiently high to produce a bulk stream and greater than required to produce a drip stream, a mechanically operated gate capable of holding back the major portion of the bulk stream and adapted to partially cut off a portion of the latter to change it into a drip stream, and connections between said control shaft and said gate for changing the position of the latter at the beginning of each cycle of operation.

4. In a weighing machine of the character described, a control shaft arranged to be operated in successive cycles, a weighing device, a vibratory material discharge conduit for feeding material to said weighing device and adapted to be operated at a rate of vibration sufficiently high to form a bulk stream and greater than is required to form a drip stream, during both bulk and drip feeding cycles, a hopper for supplying material to said conduit and through which material is delivered in varying quantities in accordance with the static pressure of the material therein, a mechanically operated gate positioned intermediate the ends of said conduit in the path of the forwardly moving material therein, said gate being capable of holding back the major portion of said material, and being spaced from the throat of said hopper to form a reservoir for the material to enable the latter to expand and absorb any variation in the flow of the material emanating from said hopper throat whereby a uniform stream of material may be produced when the gate is lowered to cut off a portion of the bulk stream to change the latter into a drip stream, and connections between said control shaft and said gate for changing the position of the latter at the beginning of each feeding cycle.

5. In a weighing machine of the character described, in combination, means including a control shaft arranged to be operated in successive cycles, a weighing device, a vibratory conveyor for feeding material to said weighing device, means for vibrating the conveyor at relatively high rate of vibration, a hopper for supplying material to said conveyor and through which material is delivered in variable quantities in accordance with the static pressure of the material therein, a gate being positioned intermediate the ends of said conveyor and in the path of the forwardly moving material therein, said gate being capable of holding back the major portion of the material for changing the size of the stream to a drip stream independently of the intensity of vibration of the conduit, and connections between said control shaft and said gate for changing the position of the latter at the beginning of each cycle of operation.

6. In a weighing machine of the character described, in combination, means including a control shaft arranged to be operated in successive cycles, a weighing device, a vibratory material discharge conduit for feeding material to said weighing device, means for vibrating the conduit at a relatively high rate of vibration, a hopper for supplying material to said conduit and through which material is delivered in variable quantities in accordance with the static pressure of the material therein, a gate positioned intermediate the ends of said conduit spaced from said hopper and capable of holding back the major portion of the material for changing the size of the stream to a drip stream independently of change in vibration of the conduit to provide bulk and drip cycles of operation and connections between said control shaft and said gate for changing the position of the latter at the beginning of each cycle of operation, said connections including a cam mounted on said control shaft and means operatively connecting said cam and said gate to increase the size of the stream at the beginning of the bulk cycle of operation and to decrease the size of the stream at the beginning of the drip cycle of operation.

7. In a weighing machine of the character described, a control shaft arranged to be operated in successive cycles, a weighing device, a vibratory material discharge conduit for feeding material to said weighing device and adapted to be operated at a substantially constant rate of vibration, sufficiently high to form a bulk stream and greater than is required to form a drip stream during both bulk and drip feeding cycles, a hopper for supplying material to said conduit and through which material is delivered in varying quantities in accordance with the static pressure of the material therein, a mechanically operated gate positioned intermediate the ends of said conduit in the path of the forwardly moving material therein, said gate being capable of holding back the major portion of said material and being spaced from the throat of said hopper to form a reservoir for the material to enable the latter to expand and absorb any variation in the flow of the material emanating from said hopper throat whereby a uniform stream of material may be produced irrespective of changes in the static pressure of the material emanating from said hopper when the gate is lowered to cut off a portion of the bulk stream to change the latter into a drip stream, and connections between said control shaft and said gate for changing the position of the latter at the beginning of each feeding cycle.

8. In a weighing machine of the character described, a control shaft arranged to be operated in successive cycles, a weighing device, a vibratory conveyor for feeding material to said weighing device, means for vibrating the conveyor at a rate of vibration sufficiently high to form a bulk stream and greater than is required to form a drip stream, during both bulk and drip feeding cycles, a gate positioned intermediate the ends of the conveyor capable of holding back the major portion of the material to change the size of the stream being discharged from a bulk stream to a drip stream independently of the vibration of the conveyor and to effect a damming of the material behind the gate, and connections between said control shaft and said gate for changing the position of the latter at the beginning of each feeding cycle.

STANLEY R. HOWARD.